United States Patent [19]
Walters

[11] Patent Number: 5,414,622
[45] Date of Patent: May 9, 1995

[54] METHOD AND APPARATUS FOR BACK PROJECTING IMAGE DATA INTO AN IMAGE MATRIX LOCATION

[76] Inventor: Ronald G. Walters, 10229 Clipper Cove, Aurora, Ohio 44202

[21] Appl. No.: 150,899

[22] Filed: Feb. 1, 1988

Related U.S. Application Data

[63] Continuation of Ser. No. 798,734, Nov. 15, 1985.

[51] Int. Cl.$^6$ .............................................. G06F 15/48
[52] U.S. Cl. .................................................. 364/413.19
[58] Field of Search ............. 364/414, 413.13, 413.19, 364/413.2, 413.21, 413.22; 128/916

[56] References Cited

U.S. PATENT DOCUMENTS

| | | | |
|---|---|---|---|
| 3,881,110 | 4/1975 | Hounsfield | 250/360 |
| 4,293,912 | 10/1981 | Walters | 364/414 |
| 4,620,153 | 10/1986 | Hino | 364/413.13 |
| 4,626,991 | 12/1986 | Crawford | 364/413.21 |
| 4,656,584 | 4/1987 | Katsumato | 364/413.15 |
| 4,680,709 | 7/1987 | Srinivasan | 364/413.21 |

OTHER PUBLICATIONS

"Software Tools in Pascal", B. W. Kernighan, P. J. Plauger, pp. 275-283, 1981.
Lakshaminarayanan, A. V., "Reconstruction from Divergent Ray Data", Technical Report No. 92, State University of N.Y. at Buffalo, Dept. of Computer Science, Jan. 1975.

*Primary Examiner*—Gail O. Hayes

[57] ABSTRACT

The present invention includes a back projector (44) suitable for assisting in the reconstruction of computerized tomography projection data. In particular it provides a fast and universal back projection system which can accomodate virtually any scanner geometry. The back projector (44) is based on an algorithm which involves the scaling of an image matrix pixel location to determine a pointer into a projection data memory (114). A linearization memory (112) contains pointers into a projection data memory (114). The location of the pixel is used to determine the proper location within the linearization memory (112) preferably using a linear interpolation process. The projection data contained in memory (114) is also preferably extracted using a similar interpolation process.

21 Claims, 6 Drawing Sheets

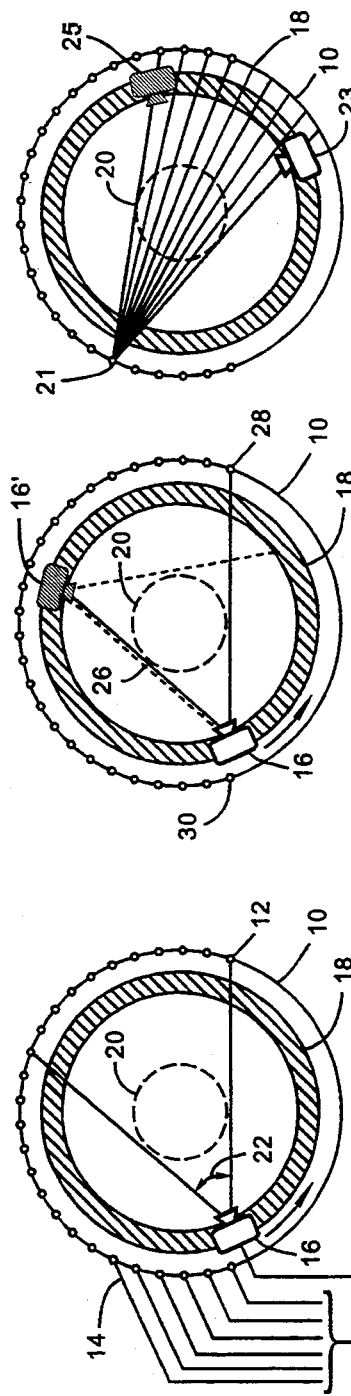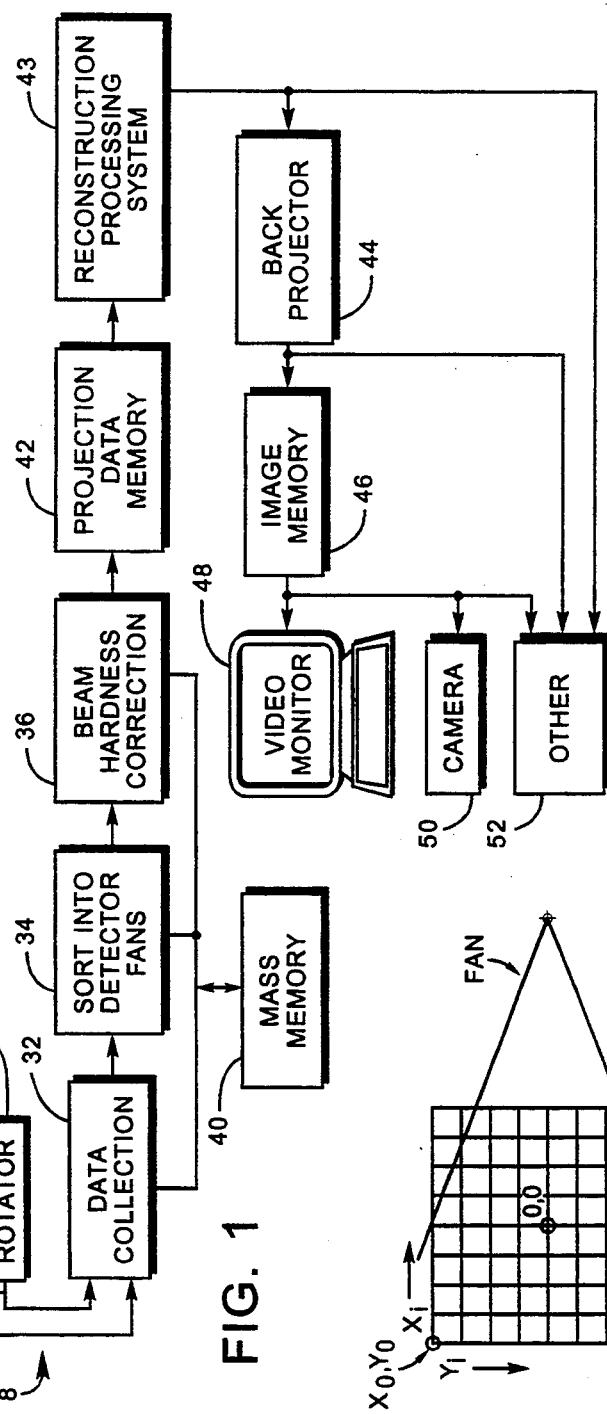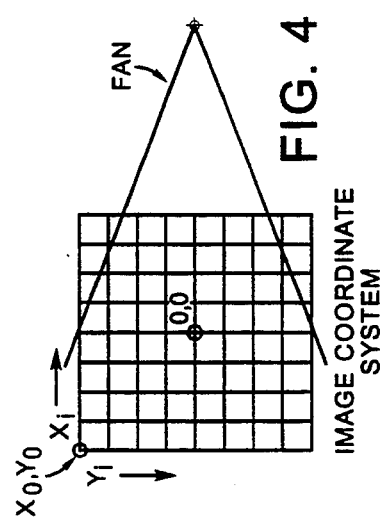

METHOD AND APPARATUS FOR BACK PROJECTING IMAGE DATA INTO AN IMAGE MATRIX LOCATION

CROSS-REFERENCE TO RELATED APPLICATION

This application is a continuation of application Ser. No. 06/798,734, filed Nov. 15, 1985, still pending.

FIELD OF THE INVENTION

This invention generally relates to computerized tomography ("CT"). More particularly, the present invention is directed to reconstructing images from attenuation data taken by CT scanners.

BACKGROUND OF THE INVENTION

CT scanning is a relatively young but well-known technology. In simple terms, CT scanning is a nondestructive or noninvasive method of generating sectional views of an object. The concept of CT scanning has been applied to industrial processes, flaw detection and geological sub-strata analysis, for example. Medical CT scanning has also been found to be very useful. The medical community has adopted the technique for obvious reasons, and medical applications will be emphasized herein, although the present invention could be used in conjunction with any CT system irrespective of the nature of the test subject.

Most CT systems include a radiation source, a radiation detector and means for interpreting and displaying the data received by the detector. In medical CT scanners, the patient is typically positioned on a table between the source and detector, wherein the source and detector are contained within an imaginary plane which is typically substantially perpendicular to the patient's longitudinal axis. Radiation is directed through the patient, and the detector senses radiation which is not scattered or absorbed by the patient. The amount of radiation which reaches the detector is inversely related to the density of the "slice" of the patient being examined.

The irradiated slice creates a shadow or "projection" on the detector analogous to the pattern which is received and displayed by traditional X-ray film. Once the data for a given slice have been collected, the patient table is indexed to a new position and another slice is analyzed. The data captured by the detector or detector array are stored in memory, processed and "back projected" onto an "image matrix" to create a sectional density map of the irradiated slice.

Early medical CT scanners included a single X-ray source and a single detector. The source and detector were linearly traversed across the body under examination and then rotated a few degrees and linearly traversed again. Thus, the source created a plurality of substantially parallel rays for any given view. While projection of the parallel-ray data was relatively simple and fast, this type of machine was fairly slow primarily due to the laborious traverse and rotate method of collecting the data. Speed is of the essence in a CT medical scanner since even the slightest movement of the patient at any time during the scan will cause the image to blur. Even shallow breathing can seriously impair the CT analysis of a patient's torso, for example. Unfortunately, traverse and rotate scanners, so-called first generation machines, required several minutes to complete a scan sequence.

To improve the speed and accuracy of CT scanners, second generation machines included a linear array of detectors rather than a single detector. A single source was linearly traversed across the patient and the resulting parallel rays were detected by the linear detector array. Following such a traverse sequence, the detector array and the X-ray tube were rotated a degree or so and the traverse sequence was repeated. The detector data, derived from parallel rays, was readily back projected to form an image, and accuracy was improved. In addition, the speed of second generation machines was generally better than that of first generation machines because the linear detector array offered several angular views, in effect, at one time. Following a traverse sequence, the detector array and source could be rotated several degrees, perhaps six degrees for six detectors, to a new position. Also, second generation machines made more efficient use of the available X-ray energy. Although the accuracy of second generation machines was improved, speed still suffered, and movement by a patient, either voluntary or involuntary, resulted in a blurred image.

In the further quest of speed, third generation CT scanners employ a fan-shaped beam of radiation which irradiates a plurality of detectors simultaneously. See, for example, U.S. Pat. No. 3,881,110. Such third generation machines typically include a single X-ray tube and a curvilinear array of detectors. The detector array and the X-ray source are located on the same radius but on opposite sides of the patient. They rotate about the patient in synchrony, with the detectors receiving the portion of the fan-shaped beam which is not absorbed or scattered by the patient. In the earliest third generation machines, the raw data collected by the detectors were typically reorganized or "rebinned" into a format which approximated traverse and rotate data. These scanners have an inaccuracy in that the attenuation data required by a rotating fan beam scanner does not exactly duplicate the data of a traverse and rotate scanner. Rather, some approximation must be made in binning the fan beam data into parallel ray data.

Accuracy was improved in fan-beam machines through the use of an algorithm disclosed in the article *Reconstruction from Divergent Ray Data*, by A. V. Lakshaminarayanan in "Technical Report No. 92", State University of New York at Buffalo, Department of Computer Science, January, 1975.

In spite of the fact that the "traverse" aspect of CT scanners was eliminated by third generation geometries, further increases in speed were desired. Back projection of "divergent data" (data derived from a fan-beam geometry) is more complex than back projection of "parallel data" (data derived from a parallel-beam geometry). Back projection of divergent data therefore generally requires the computer within the CT scanner to perform a greater number of arithmetic operations.

In an attempt to further improve speed and accuracy of medical CT scanners, fourth generation CT scanners employ large arrays of completely stationary detectors. The detectors are typically evenly spaced in circular fashion about the patient table, such that the center of the circle is substantially coincident with the patient's longitudinal axis. And, only the X-ray source, coplanar with the ring of detectors, is rotated in fourth generation machines. Thus it is clear that fourth generation machines are at least conceptually mechanically faster than earlier generation machines, since only the relatively small X-ray tube is rotated. The rotation speed of the tube can be quite high without mechanically distorting the gantry. However, it is perceived that the computational speed of medical CT scanners, including fourth generation machines, can and should be further increased.

The earliest fourth generation CT scanners included a ring of detectors which completely circumscribed the patient. The speed of later fourth generation machines was further improved through the realization that 360 degrees of detectors was unnecessary. See U.S. Pat. No. 4,293,912, issued to Walters.

It is therefore apparent that the mechanical and computational speed of CT scanners has improved over the years. The increase in mechanical speed is particularly impressive when the original traverse and rotate technique is compared to fourth generation machines wherein the X-ray tube rapidly (e.g., in one second or less) rotates about the patient. However, it is perceived that an increase in computational speed is still needed. Further, it is desirable to reduce the overall number of interpolations which are performed within CT scanners to improve their resolution.

The present invention is directed to a back projector which in preferred embodiments improves the speed and accuracy of CT scanners regardless of their source/detector geometries. For example, third and fourth generation medical CT scanners can incorporate the back projector. A series of simple coordinate transformations are used in the back projection process rather than transcendental function computation, and avoiding the computation of transcendental functions reduces the back projector's complexity. Also, the need for spatial interpolations prior to back projection (for fan centering, for example) is eliminated, somewhat reducing pre-back projection computation. Additional advantageous features of the back projector of the present invention will be apparent to those skilled in the art.

SUMMARY OF THE INVENTION

The present invention includes an apparatus for back projecting data provided by a CT scanner into an image matrix location, wherein the data are associated with a particular view of a test subject.

The apparatus comprises a projection data memory suitable for containing projection data and a linearization pointer memory suitable for containing a set of projection data memory pointers.

A scaling means operatively connected to the linearization pointer memory selects a member of the set of projection data memory pointers and a means for determining the projection data associated with the image matrix location operatively connected to the scaling means and the projection data memory are provided. A means for accumulating the projection data associated with the image matrix location operatively connected to the means for determining is also provided.

BRIEF DESCRIPTION OF THE DRAWING

FIG. 1 is a schematic view of a CT scanner including a back projector according to the present invention.

FIG. 2 is a diagrammatic view of a source and array of detectors of a fourth generation CT scanner.

FIG. 3 is another diagrammatic view of the source and detectors of a fourth generation CT scanner illustrating a detector fan.

FIG. 4 is a diagrammatic representation of an image matrix and its relationship to a detector or source fan.

DETAILED DESCRIPTION OF A PREFERRED EMBODIMENT

Figure 5:
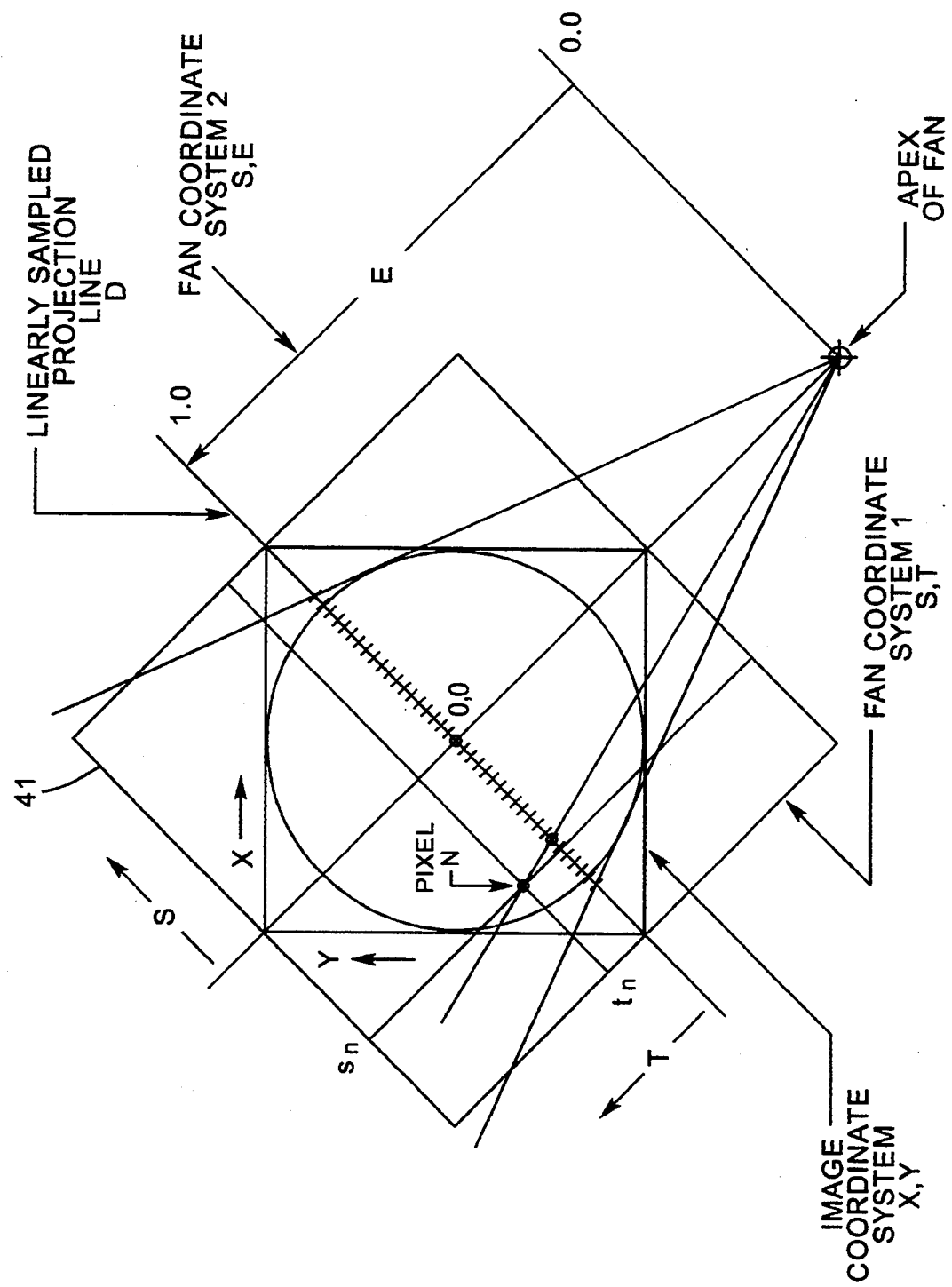
FIG. 5 is a diagrammatic representation of the geometry employed by the back projector of the present invention.

This section describes a preferred embodiment of the present invention. The invention will be described in terms of a fourth generation medical CT scanner, a particularly challenging environment for the back projector of the present invention, but those skilled in the art of CT scanning will recognize that the invention is applicable to all CT systems regardless of their source/detector geometry.

Referring to the Drawing wherein like reference numerals represent like parts and assemblies throughout the several views, FIG. 1 schematically illustrates an overall system diagram of a preferred medical CT scanner 8. The scanner 8 includes a stationary frame 10 upon which is mounted an array of X-ray detectors 12. These detectors may be individual scintillation crystals and photomultiplier tubes, solid state detectors, or they may be the ends of light pipes which connect one or several detector stations to a single photomultiplier tube or the like. Detectors 12 receive radiation and produce electronic data signals indicative of the intensity of the radiation. Because the intensity of the X-rays was known at the source, the intensity of the X-rays impinging upon an individual detector 12 is representative of the attenuation of the X-ray beam along the path between the source and the detector 12, i.e., the attenuation by the components in elemental regions of the patient's body located along that path. The electrical signals indicative of this intensity from the individual detectors are conveyed along electrical lines 14 to a processing means, further described below. It should be noted that while all of the detectors 12 are obviously connected to a processing means, only a few of the detectors 12 are shown connected to a processing means for the purposes of clarity.

The apparatus 8 further includes an X-ray source 16 which preferably produces a fan-shaped beam or swath of X-rays. There is a means 24 for rotating the X-ray source 16 around a scan or patient circle 20 and monitoring the angular position of the source. A means 18 constrains the X-ray source 16 to rotate along an arc segment of a circle's circumference. It will be noted that the detectors 12 are illustrated as being arranged only around a part of the circumference of the device in accordance with the techniques of U.S. Pat. No. 4,293,912, incorporated herein by reference, but the back projector of the present invention is not limited to this geometry. It should also be noted that the detectors 12 are substantially equally spaced about frame 10. That is, the detectors 12 are equiangularly spaced about frame 10 with reference to the patient circle 20. The X-ray source 16 only rotates a similar number of degrees about the patient circle. The present invention is not limited to this type of CT scanner, however.

Viewing the system from the point of a detector 21 of the array of detectors 12, FIG. 3, it will be seen that detector 21 receives X-rays the entire time which X-ray source 16 is located between positions 23 and 25. However, with digital processing equipment, as the preferred embodiment uses, a continuum of intensity versus time is not readily processed. Accordingly, the amount of attenuation of the X-rays reaching detector 21 is measured periodically as the X-ray source 16 traverses the arc between points 23 and 25, each sampling of detector 21 by the processing means representing the attenuation along a path through the scan circle 20. The angular spacing of these paths determines the resolution of the final tomographic image and may be as closely spaced as the physical limitations of the processing equipment will allow. Thus, although every detector is capable of producing a continuum of X-ray attenuation of data, digital data processing equipment only takes a discrete number of X-ray attenuation samplings of each detector.

Looking again to FIG. 1, the processing means is connected to the detectors 12 by lines 14 for processing a representation of the radiation attenuation in the scan circle 20 and is connected with means for displaying or storing the representations. Each time the array of detectors 12 is sampled, an element of attenuation data from each detector that is irradiated is conveyed along one of lines 14 to the data collection means 32 which forms digital representations of the log of each detector's output. Each detector sampling, it will be apparent, represents attenuation data collected along one of the paths in the fan-shaped continuum of paths received by each detected element discussed above with reference to FIG. 3.

Still referring to FIG. 1, a second signal along line 15 representative of the angular position of the X-ray source 16 is also conveyed to data collection means 32 so that each attenuation reading is coordinated with the angle through the patient at which it was taken. The data as the log of the intensity is temporarily stored in a mass memory 40 until at least one of the detector means has received all the attenuation data which it will receive. At this time, a sort means 34 starts reorganizing the data into sets of data arranged by detector fan beams. That is, all the attenuation data taken by a single detector along all angles is arranged in order as one set of attenuation data. Thus, the sort means 34 reorganizes the data from source fan data sets into detector fan beam data sets but does not bin the fan beam data sets into parallel ray data sets. It cannot be overemphasized that the present invention is not limited to detector beam format, and the system shown and described is only one possible CT scanner suitable for employing the back projector described below.

After reorganization of the data into detector fan format, the data is preferably corrected by a beam hardness correction means 36 which averages several data values of each set of data corresponding to the edge of each detector fan and subtracts the average from the set of data values, thereby correcting the detector for gain drift. Following this, each data value is modified by a non-linear operator for beam hardness correction and fed into a projection data memory 42. It should particularly be noted that the data are preferably not immediately interpolated into "equal tangent" format as taught in U.S. Pat. No. 4,293,912.

As each set of data corresponding to a detector fan is processed, it is addressed into a reconstruction processing system 43. The reconstruction processing system 43 preferably adjusts the data for angular position, removes redundant data elements from some sets of data and convolves the data with a convolution function. Such a reconstruction processing system is disclosed in U.S. Pat. No. 4,293,912.

Taken together, the apparatus from the radiation source 16 through to the reconstruction processor comprises a means for generating a plurality of sets of data, each set representing a characteristic of the attenuation of radiation. This process is repeated for each set of data.

After each set of data is convolved by the convolving means to form a convolved set of data, the convolved data are processed by a means for transforming the convolved sets of data into a representation of the planar slice of the patient irradiated. This transforming means includes a back projecting means 44, image memory means 46 and display means such as a video monitor 48. Back projector 44 along with the image memory 46 transforms the convolved data into a series of intensity representations for each pixel along the raster scan of a video monitor. Regarding the image memory 46, it should be noted that there may be another memory (not shown) in which the image is actually "built". Image memory 46 schematically represents all such image memories. Also connected with image memory 46 may be any video or image storage, display or transmission device, e.g., a camera 50. Additionally, other storage or display means 52, such as a video recorder, may be connected with the system.

The present invention is primarily directed to the back projector 44. The algorithm which forms the basis for back projector 44 will first be discussed in very general terms. This is followed by a broad description of a schematic of a preferred back projector and a functional description of same.

BACK PROJECTOR ALGORITHM

The CT scanner 8 as a whole having been described, attention will now be turned to the theory or algorithm behind the back projector 44. The back projector 44 is responsible for taking the raw data sensed by the detectors 12 and applying them to the image matrix or image memory 46 to visually create a sectional view of the patient. In most CT scanners, the back projector actually acts on convolved (or otherwise "deblurred") data, but the incoming back projector data are still generally referred to as "raw data".

The back projector of the present invention includes or is based on a particularly effective back projector algorithm. Back projectors which employ the algorithm of the present invention can provide improved image resolution through the elimination of unnecessary interpolations. And, preferred algorithms of the present invention are potentially faster in operation than some prior art algorithms.

The back projector algorithm of the present invention relies on a series of simple coordinate transformations. Referring to FIG. 4, the first coordinate system is the X, Y Cartesian coordinate system which is aligned with the "image matrix". An image matrix is a collection of data which represents a density map of a section of the patient or other object under examination. A visual embodiment of the image matrix is the sectional image which is portrayed on the monitor or screen 48 which is associated with the CT scanner 8.

Further with regard to the X, Y coordinate system, the screen is comprised of a matrix of picture elements, or pixels. The matrix of pixels is the visual equivalent of the image matrix, and there may be 512 times 512 pixels or more on a given screen: 512 pixels along the X axis and 512 pixels along the Y axis. In the image memory 46 there is a memory location corresponding to each of the pixels of the monitor 48, and the memory locations serve as accumulators for the density information provided by the back projector. In view of this one-to-one correspondence between pixels and memory locations in the image memory, the two concepts are used interchangably herein.

The back projector algorithm of the present invention is pixel-driven in the sense that the location of the matrix element is the independent variable. Referring to FIG. 4, the back projection process preferably starts in the upper left hand corner, proceeds to the right, drops down to the next row, proceeds right to left, and so on. This serpentine pattern continues until all of the pixels have been visited. Thus, for a given view the back projector determines the density data which should be back projected or summed into each of the memory locations in the image memory. Once the back projector has completed its back projections for all of the pixels for a given view, the fan is in effect indexed to its next position or view. Thus it can be seen that the back projector has a momentous task indeed: if a screen has 512 pixels on a side and there are 512 X-ray detectors, the back projector must complete $512^3$ back projections in order to create a sectional image.

FIG. 5 also shows the image matrix with its X, Y coordinates. In addition, FIG. 5 depicts the other two coordinate systems employed by the back projector algorithm of the present invention, the S, T and S, E coordinate systems.

The S, T coordinate system is a Cartesian system which is aligned with an imaginary linearly-sampled projection line D. The T axis is perpendicular to the D line, while the S axis is collinear with the D line. Projection line D (S axis) extends through the center of the scan circle and includes a series of equally-spaced points which correspond on a one-to-one basis with the "linearization pointer memory" addresses, the linearization memory being further described below. It should particularly be noted that the algorithm of the present invention employs a mapping from the imaginary D line, with its equally-spaced data, to a raw data line having an arbitrary spacing of detector or source locations. This can perhaps best be seen in FIG. 3. The detectors are equally spaced about the frame 10. Thus, the angles between the rays which pass through the scan circle 20 are not equal and the rays are not equally spaced along the line D passing through the center of the scan circle 20.

As noted above, the S, T coordinate system is aligned with projection line D which passes through the center of the scan circle. The projection line D, as shown in FIG. 5, is substantially perpendicular to the center-line emanating from the apex of the fan and passing through the 0, 0 point at the center of the image matrix. FIG. 5 also shows a rectangle 41 which corresponds to the S and T axes. This larger rectangle encloses the smaller square which corresponds to the X and Y axes and the larger rectangle 41 in effect moves with the fan as it indexes about the scan circle 20.

The third and final coordinate system is the S, E fan coordinate system which is also illustrated in FIG. 5. The divergent S, E coordinate system, whose origin is at the apex of the fan, utilizes the S axis or dimension from the S, T system described above. The value of $E_n$ for a given pixel n corresponds to the perpendicular distance between the apex of the fan and a line parallel to the S axis passing through the given pixel. As will be described below, weighted "raw" data will be back projected onto the pixels of the image matrix through simple transformations from the X, Y to the S, T and finally to the S, E coordinate systems.

The coordinate transformations can now be explained for a random pixel n with reference to FIG. 5. The exact position of the pixel n is known in the X, Y and S, T coordinate systems: As further described below, the initial values of S and T are known from the standard coordinate transformation of the starting pixel's X, Y position and the angle of view, and are given to the back projector at the beginning of the back projection process for the given view. By adding the appropriately scaled rotation sines and cosines (as determined by view angle) to the initial S and T values as given to the back projector by a controller, the $s_n$ and $t_n$ values for the next pixel n are calculated. This process is iterated for each succeeding pixel.

A simple relationship is used to identify the location on the D line associated with a given pixel n: the distance along the linearly sampled line D over the value of $s_n$ is equal to the distance $E_o$ of the sample line D from the apex of the fan over the distance $E_n$. This geometric relationship enables the simple scaling of the value of $s_n$ by $E_n$ to determine the value on the linearly sampled projection line D associated with pixel n. Preferably, the value of $E_o$ is unitary and the values of $E_n$ are appropriately normalized.

To determine the value along the linearly sampled projection line D, it is merely necessary to scale the $s_n$ value using the $E_n$ value which is known for any $t_n$ and is contained in a look-up table). That is, referring to FIG. 5, the "demagnification" (or magnification if $E_n$ is less than the distance from the center of the scan circle 20 to the apex of the fan) of the $s_n$ value is determined by the value of $E_n$.

This process establishes the value of the point on the projection line D which serves as an indirect pointer into a raw data memory as further described below. Actually, the demagnified (or magnified) value D of the S coordinate of pixel n is used as a real (as opposed to an integer) address for a "linearization pointer memory" which is, in effect, a map into the raw data. The value along the linearly sampled projection line D is used to access the linearization pointer to determine the real address of the raw data stored in a "H" memory. Thus, the linearization pointer memory or LIN MEM is a means of compensating for the spatial distortion of the actual data from the ideal equal spacing of the D line shown in FIG. 5.

The real addresses referred to above are made up of integer and fractional components. These components are preferably used to access adjacent data in a unique way, described below, and the data are provided to an interpolator. The accuracy of the back projection process is thereby improved.

When the raw data corresponding to a particular location on the D line is actually determined, it is weighted by $1/E_n^2$ and "projected" or added to the image memory location corresponding to the $s_n$, $t_n$ pixel ($x_n$, $y_n$ pixel). As well known to those skilled in the art, all pixels lying along the ray which passes through pixel n will receive a weighted contribution from the same raw data.

It should be noted that this coordinate transformation process is undergone for each pixel within the X, Y matrix prior to rotating the fan to a new position. Once the fan is rotated to a new position, the initial values of S and T must be changed along with the rotation sine and cosine and the raw data which corresponds to the new view.

It should particularly be noted that the algorithm does not require the calculation of transcendental functions but merely relies on simple coordinate transformations.

Also, the raw data which is contained within the "H" memory is preferably data which has at least been de-blurred using a convolution function or the like.

In addition, the back projector algorithm of U.S. Pat. No. 4,293,912 also employs an equal tangent or equally-spaced reordering of the data, but the algorithm of that patent operates in a different fashion.

Schematic of Back Projector

Figure 6:
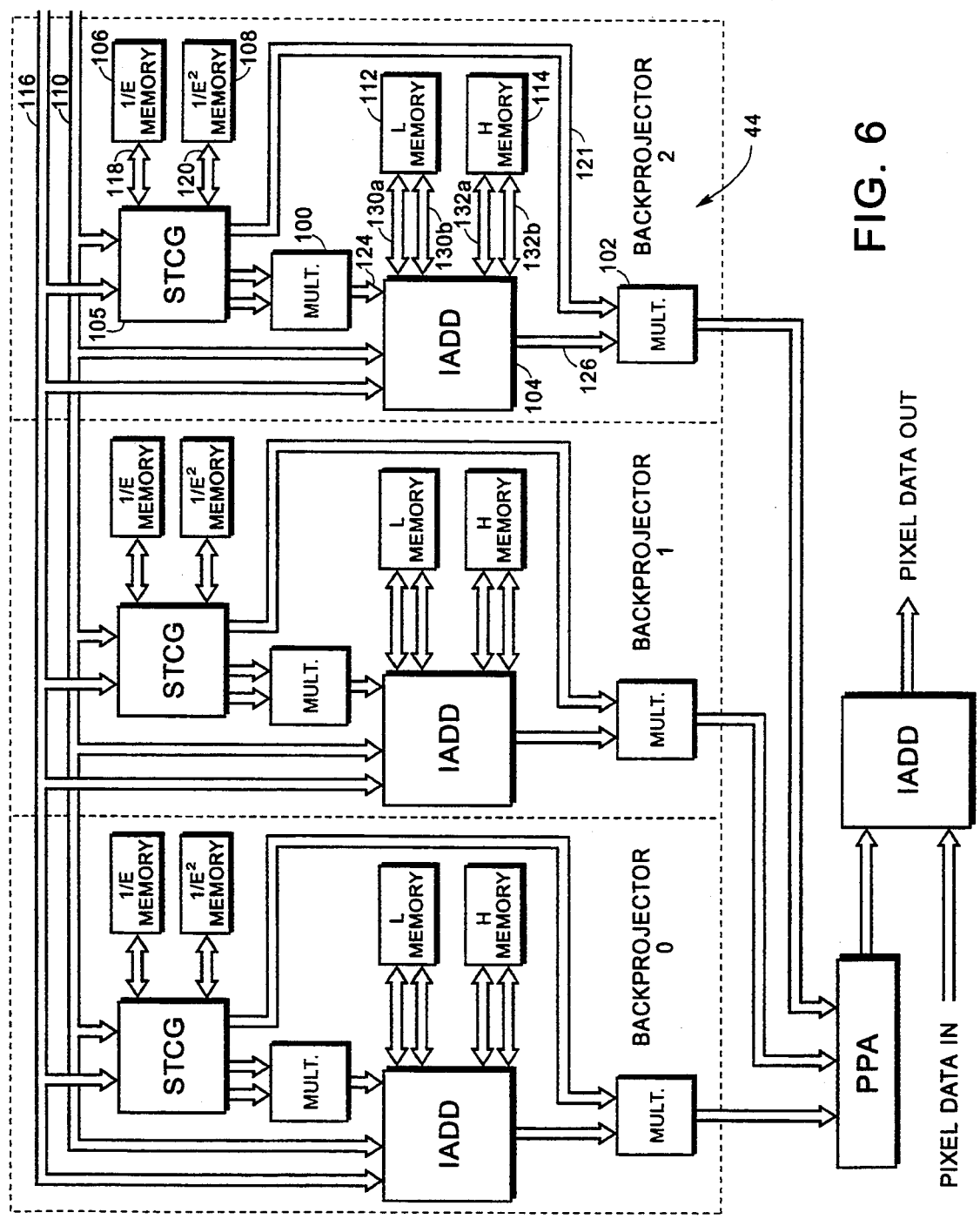
FIG. 6 is a schematic view of a series of "daisy-chained" back projectors of the present invention.

FIG. 6 shows a block diagram of a series of daisy-chained preferred back projectors 44. Included in each back projector 44 is a pair of multipliers 100 and 102 and an interpolater/adder 104. The internal structure of units 100, 102 and 104 will become evident to the skilled artisan in view of the functional description of back projector 44 set out below. Also included in each preferred back projector 44 is an ST coordinate generator module 105, the function of which will be described below. It should be emphasized again that the figures depict a preferred embodiment, not the sole embodiment of the invention. For example, back projector 44 could be accomplished solely through software, but preferably the components 100, 102, 104 and 105 are implemented with VLSI integrated circuits, the structure of which will become evident in view of their function.

Back projector 44 preferably includes six RAM memory units, although only four are shown in the schematic FIG. 6. Two of the memory blocks shown in FIG. 6 are actually comprised of two memories, as further described below. Memories 106 and 108 hold the 1/E and $1/E^2$ information for each slice. The 1/E and $1/E^2$ data are supplied by the controller through data line 110 prior to the initiation of the back projection process for a given slice; typically, they need not be updated for each view. The data supplied by the controller in line 110 is routed through module 105 and data paths 118 and 120 when the module 105 is in the proper state or mode as specified by the controller on path 116.

Memory unit 112 makes up the linearization pointer memory or LIN. MEM., described above. Similarly, memory 114 comprises the H. MEM. which contains the raw data. Prior to the back projection for a given view (one view of a slice being diagrammatically depicted in FIG. 5), the information for memories 112 and 114 is renewed by the controller, via signal path 110, interpolator/adder module 104 and signal paths 130 and 132, which signal paths 130 and 132 interconnect memory units 112 and 114, respectively, and interpolator-/adder 104. It should be noted that the LIN. MEM. data might be unchanged from view to view, however.

As noted above, signal path 110 is a means for communicating data from the controller (not shown) to the back projector 44. Each operational unit 104 and 105 includes a data input port through which it receives data from the controller via signal path 110. Tying the operational units 104 and 105 of back projector 44 to the controller is a control signal path 116. Although much of the back projection process for a given view is self-contained and is controlled locally by the back projector 44, the controller must load the memories 106, 108, 112 and 114, initiate and synchronize the back projection process for a given slice. The initiation and synchronization of these operations derive from the controller through path 116. Control signals representing the mode of operation of back projector 44 are conveyed over signal path 116 which connects to units 104 and 105. Although the precise electronic components which make up the control circuitry are not shown, the functional description of the back projector 44 will make such control circuitry or program quite evident to those skilled in the art.

As noted above, multiplier blocks 100 and 102 are preferably substantially identical. Referring to FIG. 6, each includes a pair of data inputs. Each also includes an output for the result of a multiply operation.

Still referring to FIG. 6, module 104 interpolates data which it receives from the LIN. MEM. memory device 112 and from the H. MEM. memory device 114. Thus the interpolator/adder 104 includes a LIN. MEM. address port (not shown) and a pair of LIN. MEM. data ports 130; and also includes a H. MEM. address port or terminal (not shown) and a pair of H. MEM. data ports 132. Linear interpolation is performed between the data received on the two LIN. MEM. data signal paths 130 and the two H. MEM. data signal paths 132, as functionally described below.

The various schematic components of the back projector 44 are preferably interconnected substantially as shown in FIG. 6. Signal path 118 interconnects the module 105 to the data port on 1/E memory device 106. Similarly, path 120 connects the data port on the $1/E^2$ memory device 108 to the module 102. The device 105 preferably includes registers which hold the 1/E and $1/E^2$ values so that they can be provided at the correct time to the multipliers 100 and 102.

Turning to the multiplier 100, it receives its two inputs from device 105 and its output is provided to interpolator/adder 104. Multiplier 102 receives its input from devices 104 and 105. The output of module 102 provides the results of the back projection for a given pixel at a given view.

As noted above, the interpolator/adder 104 draws its data from memory devices 112 and 114 via signal paths 130 and 132, respectively. The interpolator/adder 104 includes a pair of address output ports (not shown) for this purpose, a LIN. MEM. ADRS port and a H. MEM. ADRS port, connected respectively to the address ports (not shown) of memory devices 112 and 114.

Figure 9:
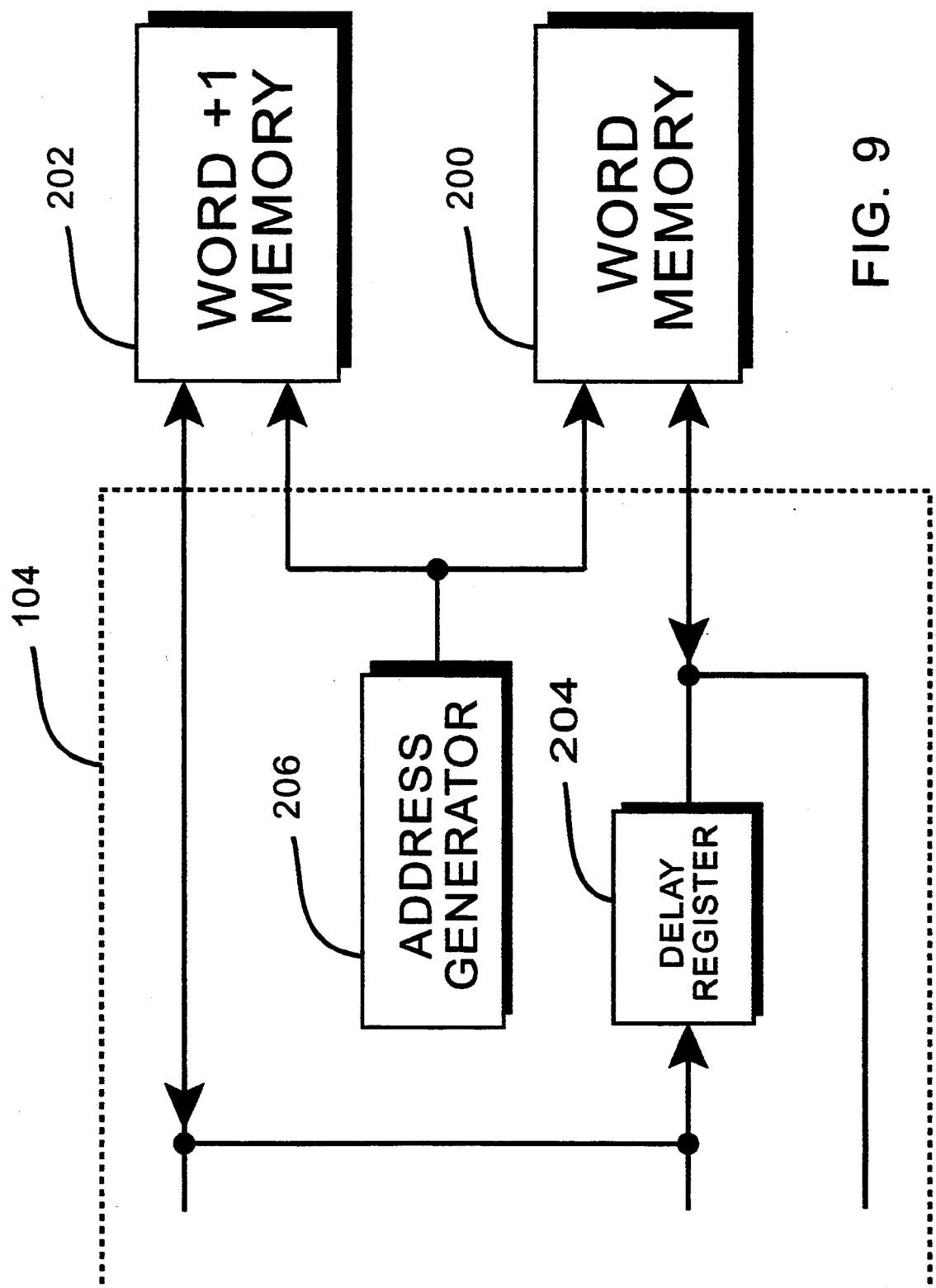
FIG. 9 is a schematic view of memory devices associated with the back projector illustrating a design which facilitates interpolation.

Preferably, LIN. MEM. and H. MEM. are each made up of two memory modules, called the WD (word) and WD+1 (word plus one) memories 200 and 202. See FIG. 9. The WD and WD+1 memories contain the same data, but the data are shifted one memory location in the WD+1 memory in comparison to the WD memory. And, the WD and WD+1 memories have common address ports but isolated data ports. Therefore, when an address is simultaneously presented to the WD and WD+1 memories, the memories provide, in effect, adjacent data suitable for interpolation. This scheme clearly simplifies the address generation problem and allows the adjacent data to be accessed in parallel rather than sequentially. Generally, it has been found that doubling the memory size is less expensive than using a smaller memory and doubling the speed.

Referring again to FIG. 9, the LIN. MEM. and H. MEM. memory devices each include WD and WD+1 memory modules. The WD+1 memory module is directly loaded by the controller, while a delay register 204 is interposed between the controller and the WD memory module. Thus, when an address generator 206 operates sequentially to place data in location n of the WD+1 memory module, it places the same data in the n+1 location of the WD memory module.

Functional Description

Figure 7:
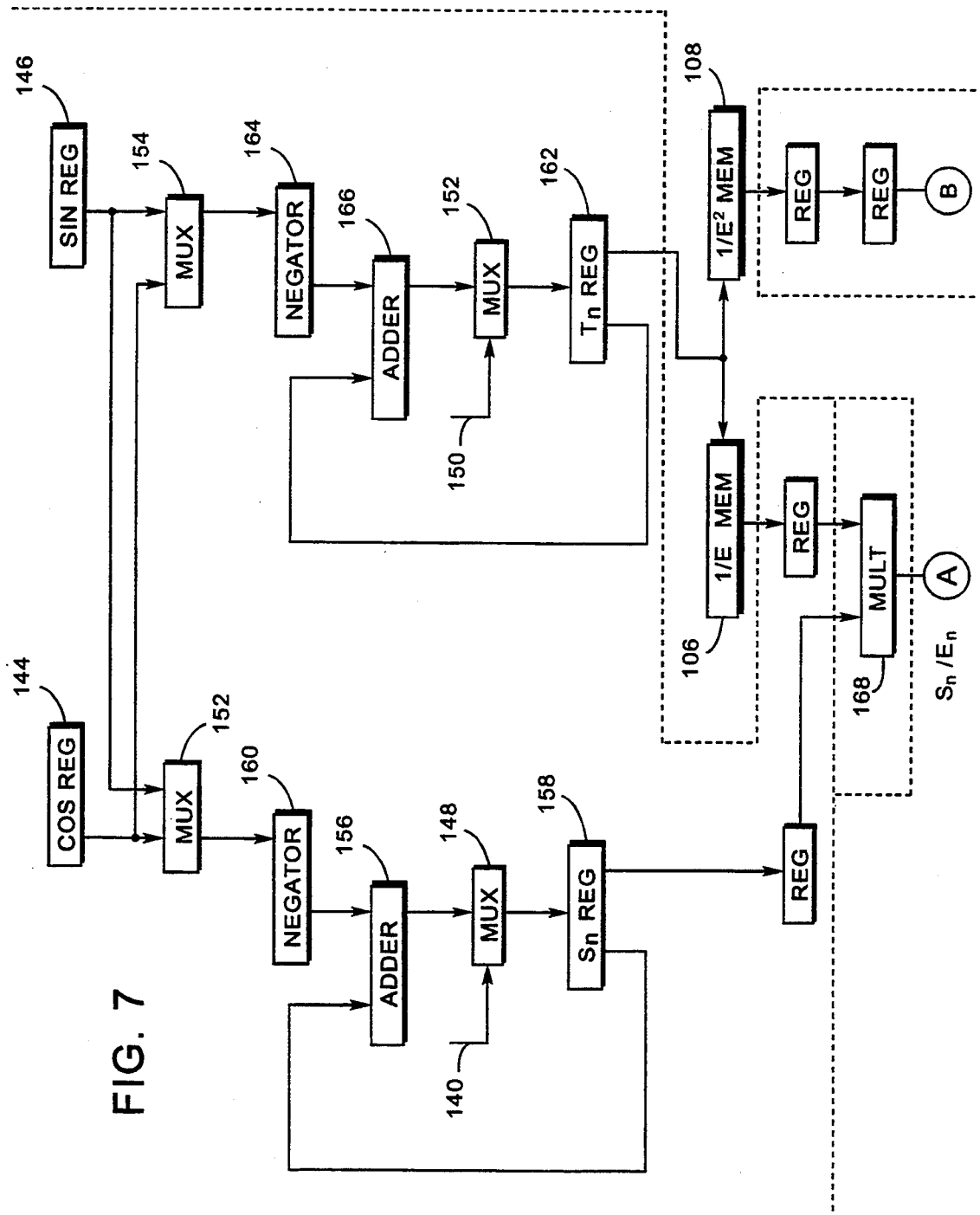
FIG. 7 is a functional diagram of a portion of a preferred back projector.
Figure 8:
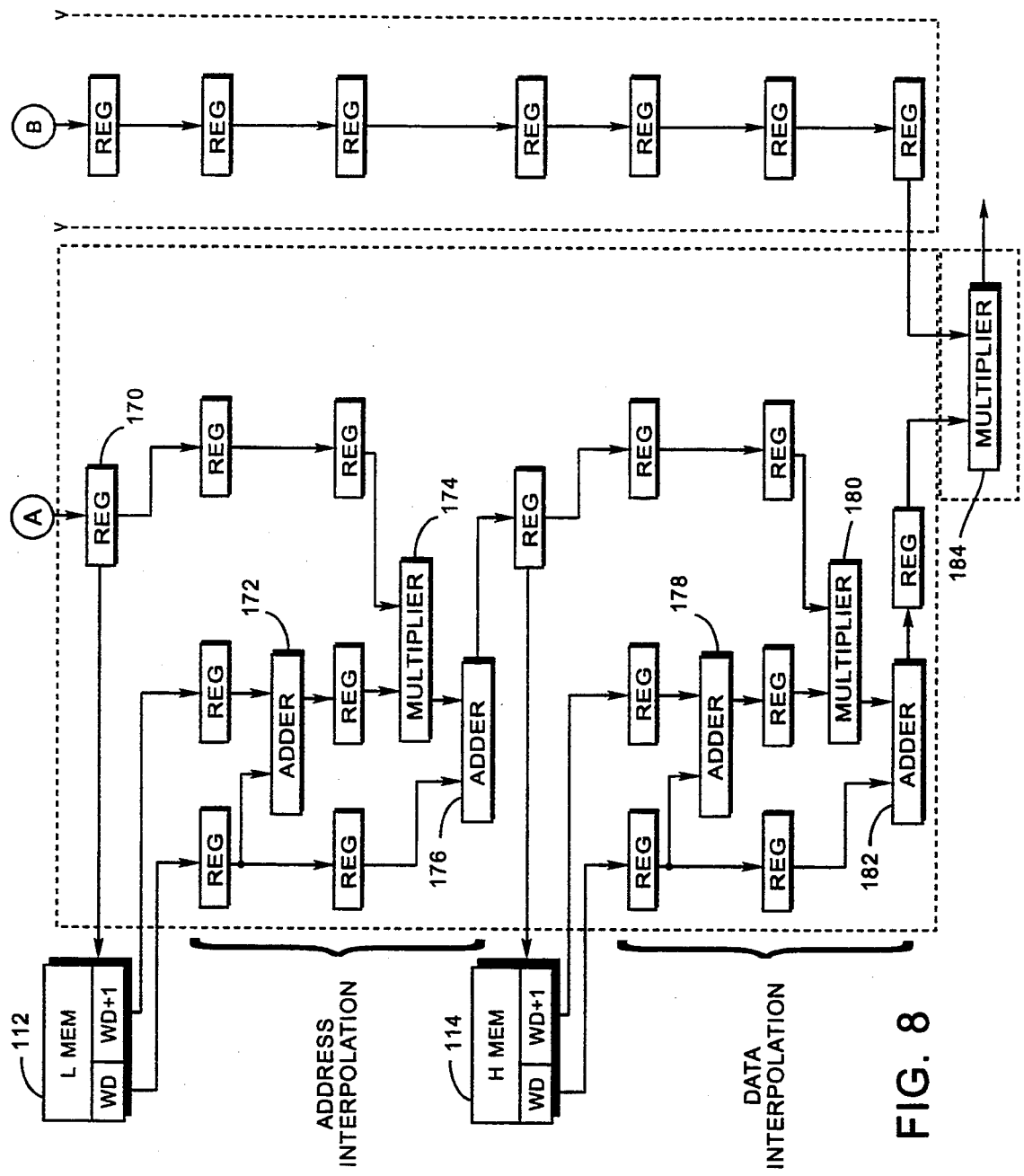
FIG. 8 is a function diagram of the remaining portion of a preferred back projector.

FIGS. 7 and 8 illustrate a functional block diagram of the back projector 44. Referring in particular to FIG. 7, a preferred embodiment of the back projector 44 includes a $S_0$ port 140 and a $T_0$ port 150 for the initial values of S and T for a given view. Referring to FIG. 6, these values are loaded by the controller through signal path 110. The $S_0$ port 140 and $T_0$ port 150 are preferably located in module 105. Module 105 also preferably includes a COS REG register 144 suitable for holding the rotation cosine for the particular view; and, module 105 preferably includes a SIN REG register 146 suitable for holding the rotation sine for the particular view. The rotation sine and cosine are also preferably provided by the controller over signal path 110. As recognized by those skilled in the art, the rotation sine and cosine describe the orientation of projection line D and define the incremental linear transformation (partial derivatives) from the X, Y coordinate system to the rotated (in this case S, T) coordinate system. As is also known to those skilled in the art, the rotation sines and cosines are scaled as appropriate to accomodate various memory sizes, scan circle sizes and sample densities, etc.

Proceeding downward through the functional blocks of the diagram of FIG. 7, the $S_0$ port 140 provides a data input to a multiplexor 148 which in turn is connected to a register 158. The register 158 communicates with an adder 156, the output of which is connected to a second input of multiplexor 148. The second input of the adder 156 comes from a negator 160. The negator 160 is supplied its input by a multiplexor 152. The inputs to multiplexor 152 are supplied by the cosine and sine registers 144 and 146, respectively.

Referring to the right side of FIG. 7, the $T_0$ port 150 provides a data input to a multiplexor 152 which in turn is connected to a register 162. The register 162 communicates with an adder 166, the output of which is connected to the second input of multiplexor 152. The second input of the adder 166 comes from a negator 164. The data for negator 164 is supplied by multiplexor 154. The inputs to multiplexor 154 are from the sine and cosine registers 146 and 144, respectively.

While no effort need be made to precisely interrelate the functional block diagram of FIGS. 7 and 8 with the block diagram of FIG. 6, those skilled in the art will recognize that the top portion of FIG. 7 as thus far described corresponds to unit 105 in FIG. 6. Therefore, although it is not shown in FIG. 7, the registers 144 and 146 and ports 140 and 150 are coupled in a known way to data line 110 (shown in FIG. 6) and the controller loads the registers and provides data to the ports prior to initiation of the back projection process for a given view.

The output of the $T_n$ register 162 is used to access memory devices 106 and 108, shown in FIGS. 6 and 7. The $1/E_n$ value from memory device 106 is multiplied by the $S_n$ output from register 158 in a multiplier 168 and delivered to a register 170. Clearly, some of the registers illustrated in FIGS. 7 and 8 function only to bring various portions of the "pipeline" into synchrony, and those need not be discussed in any detail. For example, the $1/E_n^2$ value which is supplied to device 102 in FIG. 6 through signal path 121 is simply shuttled through a series of timing registers for obvious timing reasons, as shown in FIGS. 7 and 8.

Referring to FIGS. 6 and 8, register 170 which stores the $S_n/E_n$ value is preferably within interpolator/adder 104 which uses the data in register 170 to access memory device 112 to interpolate the LIN. MEM. data. The data received from the memory device 112 is then linearly interpolated using a well known digital technique, referring again to FIG. 9 and the accompanying discussion: The difference between the data in the WD and WD+1 locations is multiplied by the fractional portion of $S_n/E_n$ and added to the WD data. This is accomplished by subtracting the WD data from the WD+1 data in adder 172. The difference is multiplied by the fractional portion of $S_n/E_n$ in multiplier 174. This apportioned difference is added to the data contained in the WD location of memory device 112 in adder 176.

The interpolated address data is used to interpolate the convolved data stored in memory device 114. The convolved data interpolator is preferably functionally identical to the address interpolator. It includes an adder 178 which is ultimately supplied with the WD and WD+1 data from memory device 114. The adder 178 in effect takes the difference between these values. The difference is apportioned via multiplier 180 according to the fractional portion of the address interpolation data found in adder 176. An adder 182 produces the sum of the data in the WD location of H. MEM. and the apportioned difference determined in multiplier 180.

The interpolated H. MEM. data is fed to a multiplier 184 as is the delayed $1/E_n^2$ data supplied by memory device 108 (via several timing registers). The multiplier 184 is preferably located within module 102 of FIG. 6, and the scaled convolved data from the H. MEM. is produced at the output terminal of module 102 as the result of the back projection process for a given pixel at a given view.

Operation

The back projection process is initiated by the controller. Referring to FIG. 6, data is provided to the memory devices 106, 108, 112 and 114. In addition, referring to FIG. 7, the $S_0$ and $T_0$ ports and the SIN and COS registers 140, 150, 146 and 144, respectively, are supplied by the controller. The controller also places signals on path 116 (see FIG. 6) to control the components 105 and 104 accordingly.

As noted above, the back projection algorithm of the present invention is pixel driven in the sense that the pixel coordinates are the independent variables. The $S_0$ and $T_0$ values supplied via ports 140 and 150 correspond to the coordinates of the first pixel in the image matrix shown in FIG. 5, these values being supplied by the host computer. Subsequent values of $S_n$ and $T_n$ are generated by back projector 44 so that the algorithm sequentially "walks through" the image matrix in a back-and-forth or serpentine manner. Once the back projection is completed for all of the pixels for a given fan position, the controller supplies new data at least for the memory device 114, and perhaps for the memory devices 106, 108 and 112. As those skilled in the art will recognize, it may not be necessary to alter the 1/E, $1/E^2$ and LIN. MEM. memories for a given slice.

With reference to FIGS. 7 and 8, the back projector 44 is functionally arranged as a "pipeline". That is, it includes a series of stages which serially process the data for a given pixel, and several different pixels can be in the pipeline at any given moment. U.S. Pat. No. 4,293,912, incorporated herein by reference, discloses a pipeline pixel-driven process which is somewhat similar to the embodiment shown in FIGS. 7 and 8. The earlier patented system does not include a LIN. MEM. or a S,T coordinate system, but otherwise it is somewhat functionally similar to the embodiment disclosed herein.

Referring again to FIGS. 7 and 8, ports 140 and 150 and registers 144 and 146 are supplied with data by the controller for the first pixel. The multiplexors 148 and 150 select the $S_0$ and $T_0$ values and load them into registers 158 and 162, respectively. The preferred path is left to right through the first row of pixels; then down to the next row; then right to the left, and so on. See U.S. Pat. No. 4,293,912 for an example of such a pixel-driven process.

The $S_0$ and $T_0$ values of the first pixel in the upper left hand corner of image matrix X, Y fall through the pipeline into registers 158 and 162, respectively. The $T_0$ value is used to access the 1/E and $1/E^2$ memories 106 and 108, respectively. The data pulled from 1/E memory 106 corresponds to the $1/E_0$ value for the first pixel, and this value is used to "demagnify" (or magnify) the $S_0$ value to determine the appropriate value on the linearly sampled data line D. This demagnification (or magnification) is accomplished by multiplying the $S_0$ value by 1/E in multiplier 168.

Referring to FIG. 8, the $S_0/E_0$ value is used to access LIN. MEM. 112 to determine a real (as opposed to integer) pointer into the physically sampled data line which is embodied in H. MEM. 114. The LIN. MEM. 112 is in effect a series of linearly-spaced samples of the D line pointing into the physically sampled data line, and the purpose of LIN. MEM. is to act as a linear intermediary between the ideal linear geometry portrayed in FIG. 5 and the potentially irregular, nonlinear spacing of samples of the raw data which may exist. The real pointer is derived by interpolating between the information stored in the WD and WD+1 locations corresponding to the closest points on either side of the point of intersection of the ray passing through the $S_0$, $T_0$ pixel and linearly sampled projection line D. The actual interpolation process is discussed above in some detail, and the result ends up in adder 176.

The real pointer interpolated from LIN. MEM. is used to access a pair of words WD and WD+1 from H. MEM. 114. The convolved data from these locations is interpolated with the interpolation result ending up in adder 182. This figure is scaled by $1/E_n^2$ in multiplier 184 according to a well-known principle (See U.S. Pat. No. 4,293,912) and the scaled, convolved result is sent to the image memory accumulator corresponding to the $S_0$, $T_0$ pixel.

In the run mode, to process subsequent pixels $S_n$, $T_n$, the multiplexors 148 and 150 select their respective inputs connected to adders 156 and 166, respectively. The multiplexors 152 and 154 select the appropriate partial derivatives for the direction in which the image matrix is being indexed, X or Y, so that the values of $S_0$ and $T_0$ can be incremented to "walk through" the image matrix.

The selected outputs of multipliers 152 and 154 are conditionally negated in a known way by the controller depending on the direction of the pixel addressing sequence. The negators 160 and 164 either effectively produce the negatives of their respective inputs or don't modify their inputs, depending on the state of the control line 116.

It should be noted that several back projectors 44 can be "daisy-chained" together so that several fans can be simultaneously processed. If multiple back projectors are employed, they are preferably synchronously run so that they all simultaneously operate on or back project data to a given pixel.

Once all of the convolved data for a given view or fan has been back projected onto the appropriate pixels, the controller is notified and new data are supplied for the $S_0$ and $T_0$ ports 140 and 150 and SIN and COS registers 146 and 144. In addition, the LIN. MEM. and H. MEM memories 112 and 114 are typically loaded with data corresponding to the new view, although the contents of the LIN. MEM. might remain unchanged from view to view. Following this loading process, the image matrix is again "walked through".

After all of the fans or views have been processed for a given slice, the image is fully formed and can be shown on monitor 48, for example.

It should particularly be noted that the memories are addressed as if they contained positive and negative memory locations. This is possible because of the manner in which they are loaded by the controller and those skilled in the art will recognize that this eliminates the need for offsetting coordinate systems. This permits the origin of the S, T coordinate system to be coincident with that of the physical scan circle. This is accomplished by "logical signed addressing" in the various memory devices associated with the back projector 44. Many reconstruction options are easily accommodated with this architecture as will be recognized by those skilled in the art. Perhaps the most useful of these are eccentric scan circle subsets and arbitrary rectangular subsets of same.

It should be emphasized that the present invention is not limited to any particular electronic components or combination of components, and modifications of the invention will be apparent to those skilled in the art in light of the foregoing description. This description is intended to provide specific examples of individual embodiments. which clearly disclose the present invention. Accordingly, the invention is not limited to these embodiments or to the use of elements or components having the particular configurations and specifications as presented herein. All alternative modifications and variations of the present invention which fall within the spirit and broad scope of the appended claims are included.

We claim:

1. An apparatus for back projecting data provided by a CT scanner or other object image scanner into an image matrix location, wherein the data are associated with a particular view of a test subject, comprising:
   a. a projection data memory means for storing projection data;
   b. a linearization pointer memory means for storing a set of projection data memory pointers;

c. scaling means operatively connected to the linearization pointer memory means for selecting a member of the set of projection data memory pointers;

d. means operatively connected to the scaling means and the projection data memory means for determining, based on the selected projection data memory pointer, the projection data associated with the image matrix location; and e. means operatively connected to the determining means for accumulating the projection data associated with the image matrix location.

2. The apparatus of claim 1, wherein the scaling means and the determining means each comprises means for interpolating between adjacent data, thereby increasing the accuracy of the apparatus.

3. The apparatus of claim 1, wherein the apparatus is suitable for daisy-chaining with other such apparatus, whereby data associated with a plurality of views can be simultaneously back projected into the image matrix location.

4. The apparatus of claim 1, wherein
the view is provided by a fan having a center and an apex, said apparatus further comprising:
(a) means for providing an S value for the image matrix location, wherein the S value is a function of the distance of the image matrix location from a line extending from the apex of the fan through the center of a scan circle and an E value for the image matrix location, wherein the E value is a function of the distance of the image matrix location from a line passing through the apex of the fan and substantially perpendicular to a line from the apex of the fan through the center of the scan circle; and further wherein:
(b) the scaling means comprises:
(i) a 1/E memory means for storing a plurality of 1/E values; and
(ii) means for multiplying the 1/E value for the image matrix location by the S value for the image matrix location to determine the projection data memory pointer associated with the image matrix location.

5. The apparatus of claim 1, wherein:
(a) there is an S value and a T value, each associated with an image matrix location, wherein the T value is a function of the distance of the image matrix location from a line passing through a scan circle center and substantially perpendicular to a line passing from an apex through the scan circle center, and the S value is a function of the distance of the image matrix location from a line extending from the apex of the fan through the center of the scan circle, and an E value which is a function of the sum of the T value and the distance from the apex to the scan circle center;
(b) the scaling means comprises:
(i) a 1/E memory means for storing a plurality of 1/E values which are selected by the T values; and
(ii) means for multiplying the 1/E value for the image matrix location by the S value for the image matrix location to determine the projection data memory pointer associated with the image matrix location.

6. A medical CT scanner for analyzing a patient to provide projection data to an image matrix location for a particular view of the patient, comprising:
a. means for directing a beam of radiation through the patient;

b. means responsive to the radiation passing through the patient for providing projection data indicative of the density of the patient;

c. a projection data memory means operatively connected to the providing means for storing the projection data;

d. a linearization pointer memory means for storing a set of projection data memory pointers;

e. scaling means operatively connected to the linearization pointer memory means for selecting a member of the set of projection data memory pointers;

f. means operatively connected to the scaling means and the projection data memory means for determining, based on the selected projection data memory pointer, the projection data associated with the image matrix location; and g. means operatively connected to the determining means for accumulating the projection data associated with the image matrix location.

7. The scanner of claim 6, wherein the scanner is suitable for daisy-chaining with other such scanners, whereby data associated with a plurality of views can be simultaneously back projected into the image matrix location.

8. The scanner of claim 6, wherein
the view is provided by a fan having a center and an apex and further comprising;
(a) means for providing an S value for the image matrix location, wherein the S value is a function of the distance of the image matrix location from a line extending from the apex through the center of a scan circle, and an E value for the image matrix location, wherein the E value is a function of the distance of the image matrix location from a line passing through the apex of the fan and substantially perpendicular to a line from the apex of the fan through the center of the scan circle; and wherein:
(b) the scaling means comprises:
(i) a 1/E memory means for storing a plurality of 1/E values; and
(ii) means for multiplying the 1/E value for the image matrix location by the S value for the image matrix location to determine the projection data memory pointer associated with the image matrix location.

9. The scanner of claim 6, further comprising:
a. means for providing an S value and a T value, each associated with an image matrix location, wherein the T value is a function of the distance of the image matrix location from a line passing through a scan circle center and substantially perpendicular to a line passing from an apex through the scan circle center, and the S value is a function of the distance of the image matrix location from a line extending from the apex of the fan through the center of the scan circle, and an E value which is a function of the sum of the T value and the distance from the apex to the scan circle center;
b. the scaling means comprises:
(i) a 1/E memory means for storing a plurality of 1/E values which are selected by the T values; and
(ii) means for multiplying the 1/E value for the image matrix location by the S value for the image matrix location to determine the projection data memory pointer associated with the image matrix location.

10. The scanner of claim 6, wherein the scaling means and the determining means each comprises means for interpolating between adjacent data, thereby increasing the accuracy of the apparatus.

11. A method for back projecting data provided by a CT scanner or other object image scanner into an image matrix location, wherein the data are associated with a particular view of a test subject, comprising:
   a. storing projection data having an arbitrary distribution in a projection data memory;
   b. storing projection data memory pointers in a linearization pointer memory;
   c. establishing a linearly sampled projection line evenly divided in a manner corresponding to the linearization pointer memory;
   d. scaling the image matrix location to determine the projection data memory pointer associated with the image matrix location;
   e. based on the determined projection data memory pointer, determining the projection data associated with the image matrix location; and
   f. summing the projection data into the associated image matrix location.

12. The method of claim 11, wherein the scaling and determining steps each comprises interpolating between adjacent data, whereby the accuracy of the method is increased.

13. The method of claim 11, wherein the method is simultaneously applied to data from a plurality of views to back project data from the plurality of views into the image matrix location.

14. The method of claim 11, wherein:
   a. the view is provided by a fan having a center and an apex;
   b. there is an S value for the image matrix location, wherein the S value is a function of the distance of the image matrix location from a line extending from the apex of the fan through the center of a scan circle, and an E value for the image matrix location, wherein the E value is a function of the distance of the image matrix location from a line passing through the apex of the fan and substantially perpendicular to a line from the apex of the fan through the center of the scan circle; and
   c. the scaling step comprises:
      (i) selecting a 1/E value from a 1/E memory according to the E value; and
      (ii) multiplying the 1/E value for the image matrix location by the S value for the image matrix location to determine the projection data memory pointer associated with the image matrix location.

15. The method of claim 11, wherein:
   a. there is an S value and a T value, each associated with an image matrix location, wherein the T value of the image matrix location is a function of the distance from a line passing through a scan circle center and substantially perpendicular to a line passing from an apex through a scan circle center, and the S value is a function of the distance of the image matrix location with a line extending from the apex of the fan through the center of the scan circle, and an E value which is a function of the sum of the T value and the distance from the apex to the scan circle center;
   (b) the scaling step comprises:
   (i) selecting a 1/E value, as determined by a T value, from a memory having a plurality of 1/E values; and
   (ii) multiplying the 1/E value for the image matrix location by the S value for the image matrix location to determine the projection data memory pointer associated with the image matrix location.

16. A method for analyzing a patient to provide projection data to an image matrix location for a particular view of the patient, comprising:
   a. directing a beam of radiation through the patient;
   b. based on the radiation passing through the patient, providing projection data indicative of the density of the patient;
   c. storing the projection data in a projection data memory;
   d. storing projection data memory pointers in a linearization pointer memory;
   e. establishing a linearly sampled projection line evenly divided in a manner corresponding to the linearization pointer memory;
   f. scaling the image matrix location to determine the projection data memory pointer associated with the image matrix location; and
   g. based on the determined projection data memory pointer, determining the projection data associated with the image matrix location.

17. The method of claim 16, wherein the scaling and determining steps each comprises interpolating between adjacent data, whereby the accuracy of the method is increased.

18. The method of claim 16, wherein the method is simultaneously applied to data from a plurality of views to back project data from the plurality of views into the image matrix location.

19. The method of claim 16, wherein:
   a. the view is provided by a fan having a center and an apex;
   b. there is an S value for the image matrix location, wherein the S value is a function of the distance of the image matrix location from a line extending from the apex of the fan through the center of a scan circle, and an E value for the image matrix location, wherein the E value is a function of the distance of the image matrix location from a line passing through the apex of the fan and substantially perpendicular to a line from the apex of the fan through the center of the scan circle; and
   c. the scaling step comprises:
      (i) selecting a 1/E value from a 1/E memory according to the E value; and
      (ii) multiplying the 1/E value for the image matrix location by the S value for the image matrix location to determine the projection data memory pointer associated with the image matrix location.

20. The method of claim 16, wherein:
   a. there is an S value and a T value, each associated with an image matrix location, each representing substantially perpendicular distances from a scan circle center, the T value being measured along a line substantially collinear with that passing from an apex through a scan circle center;
   b. the scaling step comprises:
      (i) selecting a 1/E value, as determined by a T value, from a memory having a plurality of 1/E values; and
      (ii) multiplying the 1/E value for the image matrix location by the S value for the image matrix location to determine the projection data memory pointer associated with the image matrix location.

21. A method for creating a sectional image of a patient, comprising:

a. generating a fan of radiation having a center and an apex and directing the fan of radiation through the patient to provide a large plurality of views of the patient;

b. sensing the radiation passing through the patient to provide projection data corresponding to the large plurality of views of the patient and placing the projection data in a projection data memory;

c. for a given several views of the patient, serially selecting a plurality of image matrix locations wherein there is an S value for each image matrix location which is a function of the distance of the image matrix location from a line extending from the apex of the fan through the center of a scan circle, and an E value for the image matrix location, wherein the E value is a function of the distance of the image matrix location from a line passing through the apex of the fan substantially perpendicular to a line from the apex of the fan through the center of the scan circle;

d. simultaneously back projecting data from several of the large plurality of views into the selected image matrix location, wherein each back projection comprises;

(i) storing projection data memory pointers in a linearization pointer memory;

(ii) establishing a linearly sampled projection line evenly divided in a manner corresponding to the linearization pointer memory;

(iii) scaling the image matrix location to determine the projection data memory pointer associated with the image matrix location, wherein the scaling step comprises:

(A) selecting a 1/E value from a 1/E memory according to the E value; and (B) multiplying the 1/E value for the image matrix location by the S value for the image matrix location to determine the projection data memory pointer associated with the image matrix location; and (iv) based on the determined projection data memory pointer, determining the projection data associated with the selected image matrix location;

e. following the back projection process for a given several views of the patient, indexing to another several of the large plurality of views; and f. displaying the sectional image of the patient developed in the image matrix.

* * * * *